United States Patent [19]

Nishizuka et al.

[11] Patent Number: 4,993,882

[45] Date of Patent: Feb. 19, 1991

[54] WASTE COLLECTION METHOD

[75] Inventors: Sakae Nishizuka; Ippei Watanabe; Shozo Maruo; Yohichiro Tsutsui; Sadahito Ishikawa, all of Yokohama; Nobutaka Koibuchi, Tokyo; Teruhiko Miyauchi, Tokyo; Koshin Kikuchi, Tokyo, all of Japan

[73] Assignees: Shimizu Construction Co., Ltd., Tokyo; Shinmeiwa Industry Co., Ltd., Nishinomiya, both of Japan

[21] Appl. No.: 207,042

[22] PCT Filed: Dec. 22, 1987

[86] PCT No.: PCT/JP87/01014

§ 371 Date: Apr. 18, 1988

§ 102(e) Date: Apr. 18, 1988

[87] PCT Pub. No.: WO88/04639

PCT Pub. Date: Jun. 30, 1988

[30] Foreign Application Priority Data

| | | | |
|---|---|---|---|
| Dec. 22, 1986 | [JP] | Japan | 61-305989 |
| Dec. 22, 1986 | [JP] | Japan | 61-305990 |
| Apr. 9, 1987 | [JP] | Japan | 62-87462 |
| Jul. 8, 1987 | [JP] | Japan | 62-170071 |
| Jul. 8, 1987 | [JP] | Japan | 62-170075 |

[51] Int. Cl.[5] ...................... B65G 51/36; B65G 51/20; B65G 51/28; B65G 51/18

[52] U.S. Cl. ........................................ 406/31; 406/62; 406/76; 406/84; 406/117; 406/148; 406/150; 406/195

[58] Field of Search ........................ 406/83, 84, 29, 31, 406/52, 62, 63, 108, 110, 66, 68, 72, 76, 14, 15, 16, 147–150, 176, 180, 1, 3, 4, 181–183, 37, 79, 82, 192, 195, 197, 117; 198/811, 468.11, 479.1, 464.2

[56] References Cited

U.S. PATENT DOCUMENTS

| | | | |
|---|---|---|---|
| 289,649 | 12/1883 | Hardie | 406/117 |
| 1,729,635 | 10/1929 | Van Steensburg | 406/31 |
| 3,236,475 | 2/1966 | Mach et al. | 406/84 X |
| 3,265,325 | 8/1966 | Buchwald et al. | 406/84 X |
| 3,490,813 | 1/1970 | Hallstrom | 406/120 X |
| 3,747,755 | 7/1973 | Senturia et al. | 209/930 X |
| 3,953,078 | 4/1976 | Aitken | 406/117 |
| 4,076,321 | 2/1978 | Haight et al. | 406/117 |
| 4,135,685 | 11/1979 | Girshovich et al. | 406/84 X |
| 4,178,662 | 12/1979 | Borodin | 406/84 X |

FOREIGN PATENT DOCUMENTS

| | | | |
|---|---|---|---|
| 1255046 | 11/1967 | Fed. Rep. of Germany | 406/110 |
| 1289492 | 2/1969 | Fed. Rep. of Germany | 406/176 |
| 1812512 | 6/1970 | Fed. Rep. of Germany | 406/84 |
| 2407482 | 8/1975 | Fed. Rep. of Germany . | |
| 2213396 | 8/1974 | France . | |
| 140378 | 10/1979 | Japan | 406/14 |
| 176216 | 7/1988 | Japan | 406/82 |
| 227171 | 9/1969 | Sweden | 406/117 |
| 471953 | 6/1969 | Switzerland | 406/117 |
| 742295 | 6/1980 | U.S.S.R. | 406/84 |
| 787305 | 12/1980 | U.S.S.R. | 406/83 |
| 1122856 | 8/1968 | United Kingdom | 406/84 |
| 2143787 | 2/1985 | United Kingdom | 406/117 |

*Primary Examiner*—Margaret A. Focarino
*Assistant Examiner*—James M. Kannofsky
*Attorney, Agent, or Firm*—Oblon, Spivak, McClelland, Maier & Neustadt

[57] ABSTRACT

This invention relates to a waste collecting method which is sanitary and in which throwing-away of waste at each location within a building can be carried out freely and without waiting time, and labors required for transporting or collecting the waste can be reduced. The waste collecting method essentially consists of operating one of a plurality of throwing devices (3) arranged respectively at a plurality of floors of a building, the one throwing device (3) having accommodated therein waste containers (2), and throwing the waste containers (2) into a vertical transport pipe (4) mounted to the building in such a fashion so as to prevent clogging of the vertical transport pipe (4), and the further step of decelerating the falling waste containers (2) at a lower portion of the vertical transport pipe (4) so as to prevent the thrown-in waste containers (2) from being broken when they reach a shut-off valve provided at a lower end of the vertical transport pipe (4).

3 Claims, 9 Drawing Sheets

WASTE COLLECTION METHOD

TECHNICAL FIELD

The present invention relates to waste collecting method and system for collecting waste produced in a building, to a predetermined location. More particularly, the invention is concerned with waste collecting method and system in which waste produced in a mansion building, a hospital, an office building or the like is thrown away from throwing sections arranged at various locations within the building, and the thrown-away waste is automatically transported through a predetermined transporting path provided in the building and is accumulated at a predetermined accumulating location.

BACKGROUND ART

Hitherto, a way has been taken in which waste produced in a building such as a mansion building or the like is filled into plastic bags or plastic buckets by each occupant in the building, and the bags or buckets are transported by human power to a waste accumulating location on the lower floor on the prescribed waste collecting dates. Further, an installation called "dust chute system" has also been employed. The dust chute system is of a vertically extending hole structure in which a dust chute extends vertically through a building, and has throwing openings at respective floors. In use of the dust chute, each occupant fills waste into plastic bags, plastic buckets or the like, and the waste is thrown away into the dust chute, with the waste maintained stored in the bags or with the waste taken out of the buckets. The waste falls down to the lower floor and is accumulated.

However, the conventional waste collecting method as described above has various problems.

That is, according to the above-mentioned first conventional method, the following problems arise.

(1) It is not preferable to store the waste within a room from the aesthetic or sanitary point of view, in a rise in demand that secures a comfortable residential space. That is, there are anxieties about occurrence of decomposition and offensive smell, contamination and the like.

(2) Since the date and hour, on which the waste can be thrown away, are restricted, it is necessary to store the waste in each door till the date and hour. Accordingly, the residential space is restricted by space, in order to secure the storage location.

(3) Since the waste collecting date and hour are limited, the time the waste is thrown away is limited for occupants and this is inconvenient for them.

(4) In general, the waste accumulating location is provided in the vicinity of an entrance of the building, for the reason that a garbage wagon is readily accessible, and for other reasons. However, the waste accommodated in the bags might frequently disperse at the waste accumulating location where there is most traffic. This is insanitary and is not preferable also from the aesthetic viewpoint.

(5) In case particularly of a multistory building, the distance from each door to the waste accumulating location increases, and prodigious labor is required for transportation work of the waste.

Moreover, the above-mentioned second conventional method, that is, the method according to the dust chute has the following problems.

(1) The waste tends to disperse within the dust chute or at the accumulating location on the lower floor, causing contamination, bad smell and the like.

(2) A problem arises as to a noise produced by the waste falling down through the dust chute.

DISCLOSURE OF THE INVENTION

The invention has been devised in view of the fact that the conventional waste collecting methods have had the problems as discussed above, and it is an object of the invention to provide waste collecting method and system in which it is possible to throw away waste at each location within a building at any time and freely without waiting time and, at the same time, it is possible to reduce labors for transporting or collecting the waste, and which are sanitary and are preferable from the aesthetic point of view.

In order to achieve the above object, a waste collecting system according to the invention is arranged such that throwing devices for throwing waste are provided respectively at various locations within a building, a vertical transport pipe is provided which communicates with these throwing devices, and a control device is provided in the vicinity of a lower end portion of the vertical transport pipe for decelerating falling speed of the waste. The waste is accommodated in waste containers each having a predetermined configuration, and is thrown away from the throwing devices. The hollow portion of the vertical transport pipe has a hollow cross-section slightly larger than the outer configuration of each of the waste containers.

The waste collecting system may have a throwing device which serves as each of the above-mentioned throwing devices, and which has the following construction. That is, the throwing device comprises a throwing opening arranged a predetermined distance away from the vertical transport pipe, a conveyer mechanism for conveying the waste containers thrown away through the throwing opening, to a location adjacent the vertical transport pipe, and a throwing mechanism for throwing away the waste containers conveyed to a terminating end of the conveyer mechanism, into the vertical transport pipe. Provision of the throwing device enables the waste containers thrown away through the throwing opening to be temporarily held, and to be thrown into the vertical transport pipe in due order. Thus, it is possible to avoid that a plurality of waste containers collide against each other within the vertical transport pipe to cause a clogging accident or the like.

Preferably, the throwing mechanism comprises a charging tube arranged at the terminating end of the conveyer mechanism and capable of closing a communication opening between the vertical transport pipe and the throwing device substantially without any gap, and pushing means capable of moving the charging tube between a first position where the charging tube closes the communication opening and a second position where the charging tube is spaced radially outwardly from the vertical transport pipe. By the charging tube, the vertical transport pipe is brought to a configuration having a hollow portion of a fixed circular cross-section including a portion which normally communicates with the throwing device. The waste container can be thrown into the vertical transport pipe in such a manner that the charging tube is pulled to the second position, the waste container is dropped to a position in front of the charging tube and on the side of the vertical transport pipe, and then the charging tube is returned to the first position.

Further, the throwing mechanism may comprise a rotary member which has a generally cylindrical shape. The rotary member is formed at its circumference with a plurality of accommodating sections which accommodate the waste containers one by one. Each of the accommodating sections has an inner diameter equal to that of the vertical transport pipe. The rotary member is rotatable about a rotary shaft arranged exteriorly of the vertical transport pipe. As the rotary member rotates, the accommodating sections are brought one by one to a position coaxial with the hollow portion of the vertical transport pipe. According to the throwing mechanism, the waste containers can be thrown into the vertical transport pipe in such a manner that when the accommodating section is in a position on the outside of the vertical transport pipe, the waste container is caused to fall into the accommodating section, and then the rotary member is rotated about the rotary shaft to bring the accommodating section into the position coaxial to the vertical transporting pipe.

Further, the above throwing device may be provided with a mechanism in which when the waste containers include one or ones having a defect such as breakage or the like, the defective one or ones is or are detected, and is or are discharged out of the throwing device. By provision of this mechanism, it is made possible to prevent such an accident that the waste containers are broken within the vertical transport pipe to render the environment filthy and to hinder transportation.

In addition, the above throwing device may comprise a device in which it is inspected whether or not a closure is mounted to the waste container, and if the closure is not mounted to the waste container, a warning is issued or the waste container is discharged out of the throwing device. In this case, it is possible to beforehand prevent such an accident that the waste container is broken, or the waste disperses within the vertical transport pipe, which might occur if the closure is forgotten to be mounted to the waste container.

The above-mentioned control device has the following arrangement, for example. That is, the control device comprises pressure measuring means mounted in the vicinity of a lower end of the vertical transport pipe for measuring pressure within the same, a deceleration pipe having a diameter smaller than that of the vertical transporting pipe and capable of releasing, to the outside, air within the vertical transport pipe and in the vicinity of the lower end thereof, an air discharge section provided in the deceleration pipe and capable of adjusting an opening degree of the deceleration pipe, and a control mechanism for adjusting the opening degree of the air discharge section in accordance with the pressure measured by the pressure measuring means. According to the arrangement, when the waste container starts to fall down within the vertical transport pipe, the pressure within the vertical transport pipe below the waste container is measured, the gross weight of the waste container is calculated on the basis of the pressure, and the opening degree of the air discharge section is adjusted in accordance with the gross weight, thereby making it possible to minutely control the falling speed of the waste container.

Alternatively, the control device may have the following arrangement. That is, the controller has such an arrangement that a bypass pipe is provided along the vertical transport pipe, the bypass pipe is brought into communication with the vertical transport pipe at two upper and lower locations, a blower is provided in the bypass pipe, air within the vertical transport pipe is drawn by the blower from the upper communication bore, and the drawn air is discharged from the lower communication bore into the vertical transport pipe. According to the arrangement, the falling speed is decelerated during passage of the waste container between the upper and lower communication bores, because the waste container faces upward air current. If the velocity of the ascending air current is adjusted by the blower, it is possible to minutely control the falling speed of the waste container.

Further, it is necessary to measure the falling speed of the waste container as described above, but, preferably, the falling speed is measured by a plurality of phototubes which are arranged at the inner surface of the vertical transport pipe.

After the waste container reaches the lower end of the vertical transporting pipe, the waste container may be discharged out of the pipe at the lower end thereof. Further, the arrangement may be such that the lower end of the vertical transport pipe communicates with a horizontal transport pipe, in which air is fed into the horizontal transport pipe by a blower, or air is discharged out of the horizontal transport pipe, to thereby forcibly deliver the waste container to the waste accumulating location (in the specification and claims, "forcible delivering" represents means for feeding air into the pipe or for drawing and discharging air from the pipe, thereby delivering objects within the pipe. Thus, the waste collecting system can also be arranged such that a plurality of vertical transporting pipes are provided within the building and are connected to a single horizontal transport pipe, thereby accumulating the entire waste thrown away within the building, to a single location.

The gist of the waste collecting method according to the invention will be described below. It is to be noted, however, that the description of some of functions and advantages of the method, which are apparent from the description of the above waste collecting system, will be omitted.

The waste collecting method according to the invention comprises the steps of:

(a) accommodating waste into predetermined waste containers each having a given configuration;

(b) throwing the waste containers into throwing devices arranged within a building;

(c) delivering the waste containers through a vertical transporting pipe which is connected to the throwing devices and which extends substantially vertically so as to bring floors of the building into vertical communication with each other; and (d) controlling falling speed of the waste container by adjustment of pressure within the vertical transport pipe or adjustment of air current velocity, wherein the vertical transporting pipe has a hollow portion which has a hollow cross-section slightly larger than an outer configuration of the waste container.

Further, the waste collecting method of the invention may include the throwing step in which the waste containers thrown away from the throwing device are received and held before the waste containers reach the vertical transport pipe, and are successively dropped under such control as not to give rise to collision, clogging or the like.

The above throwing step may include the step in which if the waste containers include one or ones having a defect such as breakage or the like, the defective one or ones is or are detected, and is or are discharged out of the throwing device.

Further, the above throwing step may include the step in which it is inspected whether or not a closure is mounted to the waste container, and if the closure is not mounted to the waste container, a warning is issued or the waste container is discharged out of the throwing device.

The above-mentioned controlling step may include the following steps, for example. That is, the controlling step includes the step of measuring pressure within the vertical transport pipe and in the vicinity of a lower end thereof, and the step of releasing air, to the outside, within the vertical transport pipe and in the vicinity of the lower end thereof in response to the measured pressure.

Alternatively, the above controlling step may include the following step. That is, the controlling step includes the step of drawing air at an upper location within the vertical transport pipe and discharging the drawn air to a lower location within the vertical transport pipe.

After the waste container reaches the lower end of the vertical transporting pipe, the waste container may be discharged out of the pipe at the lower end thereof. Alternatively, the steps may be continued, of bringing the lower end of the vertical transport pipe into communication with a horizontal transport pipe, and feeding air into the horizontal transport pipe by a blower, or discharging air out of the horizontal transport pipe, to thereby forcibly deliver the waste container to the waste accumulating location (in the specification and claims, "forcible delivering" represents means for feeding air into the pipe or for drawing and discharging air from the pipe, thereby delivering objects within the pipe). Thus, the above waste collecting method can also be continued to a horizontal waste transportation method, such that the entire waste thrown away within the building is accumulated to a single location.

BEST MODE FOR CARRYING OUT THE INVENTION

Preferred modes of the invention will be described in detail below with reference to the accompanying drawings.

Figure 1:
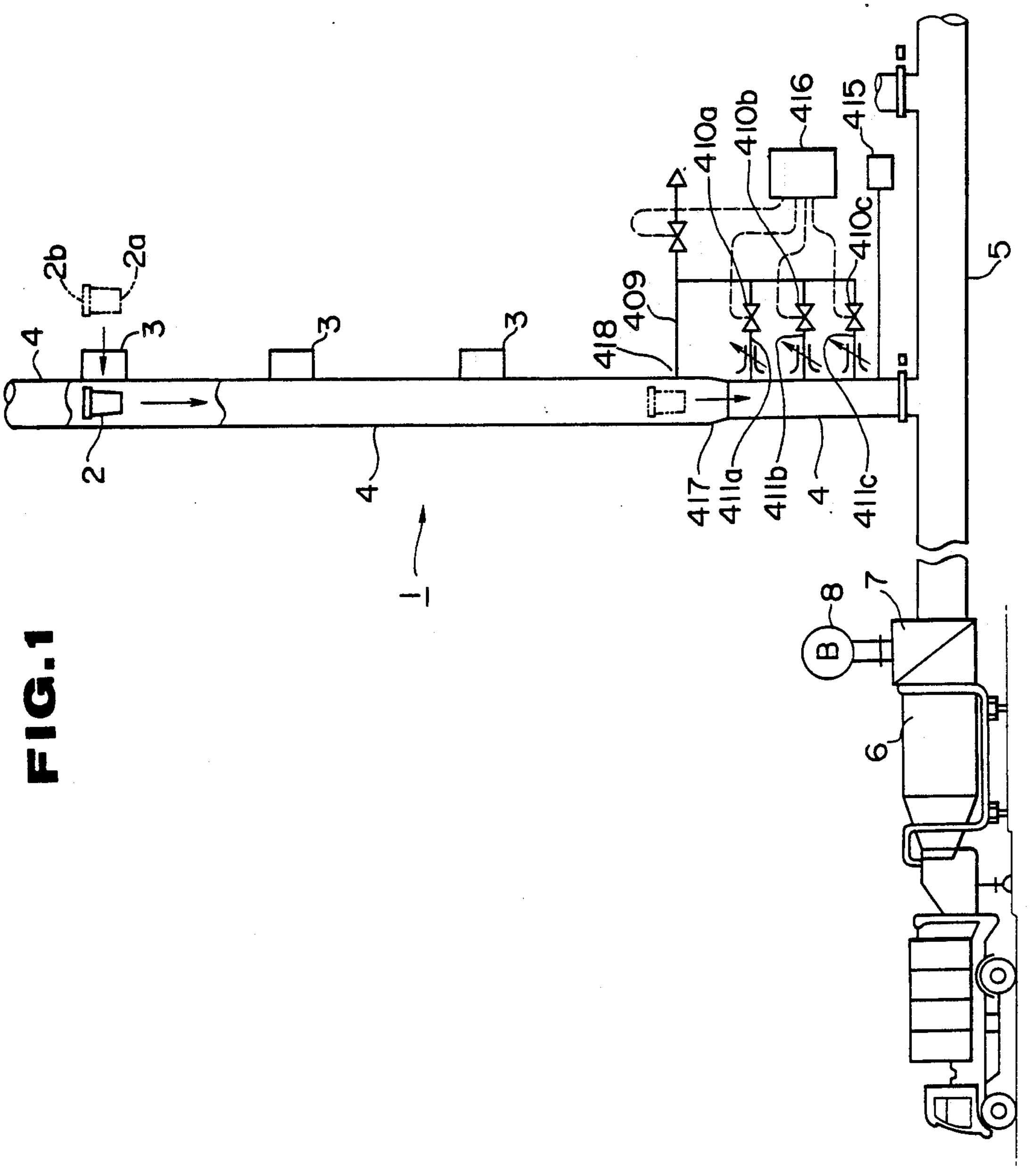
FIG. 1 is a conceptional view showing the entirety of an embodiment regarding a waste collecting system according to the invention.

FIG. 1 shows the entirety of a waste collecting system according to a preferred embodiment of the invention. In the figure, the reference numeral 1 denotes a waste collecting system. This waste collecting system comprises throwing devices 3, 3 provided at respective floors of a multistory building, a vertical transport pipe 4 so arranged as to communicate with the throwing devices 3, 3, a horizontal transport pipe 5 connected to a lower end of the vertical transport pipe 4 and laid down in a generally horizontal plane, a reservoir 6 connected to one end of the horizontal transport pipe 5 adjacent a waste accumulating location, a separator 7 connected in the vicinity of the one end of the horizontal transport pipe 5, and a blower 8 connected to the horizontal transport pipe 5 through the separator 7.

As shown in FIG. 1, a waste container 2 is composed of a container body **2*a* in the form of an inverted circular truncated cone, and a closure 2*b* fixedly mounted to an opening at an upper end of the container body 2*a* so as to be capable of being opened and closed. The waste container 2** is formed of an inexpensive and combustible material such as molded waste paper or the like, and is disposable.

On the other hand, the vertical transport pipe 4 is in the form of a hollow cylinder having the same diameter except for the vicinity of the lower end portion. The vertical transport pipe 4 has an inner diameter larger than an outer diameter of the waste container 2. The lower end portion of the vertical transport pipe 4 is smaller in diameter than an upper portion thereof. The inner diameter in the vicinity of the lower end portion is only slightly larger than the outer configuration of the waste container. Accordingly, when the waste container 2 is accommodated in the vertical transport pipe 4, a slight gap is left between them. The horizontal transport pipe 5 also has a constant inner diameter through its entire length, like the vertical transport pipe 4.

The container body **2*a* of the waste container 2 is placed in each door, and waste is received in the container body 2*a*. When the container body 2*a* is filled with the waste, the closure 2*b* is fixedly mounted to the container body 2*a* to sealingly close the same. In this state, the waste is thrown together with the waste container 2 from the throwing device 3**.

By the way, the throwing device 3 is provided with a throwing arrangement in which a plurality of waste containers 2 are temporarily stored, and these waste containers are automatically thrown into the vertical transport pipe 4. Since the plurality of waste containers 2 can temporarily be stored within the throwing arrangement, it is possible to throw the waste containers 2 into the vertical transport pipe 4 in due order even if a large number of waste containers 2 are thrown into the throwing device 3 for a short period of time. This can prevent a clogging accident of the waste containers within the waste collecting system 1, and can improve the transportation efficiency of the waste containers 2. In particular, if control means (not shown) is provided for controlling the throwing operation of the waste containers due to the throwing devices, the throwing operation of the waste containers 2 is carried out in due order by the control means so that even if a large number of waste containers 2 are thrown away at a time at a plurality of floors, the operation of the waste collecting system 1 can be made smooth. The waste collecting system comprises closures each having the same configuration of the wall surface forming the vertical transport pipe 4. The arrangement is such that except when the waste containers 2 are thrown into the vertical transport pipe 4, the closures close respectively communication openings through which the waste collecting system communicates with the vertical transport pipe 4. Accordingly, except when the waste containers 2 are thrown into the vertical transport pipe 4, the cross-section of the vertical transport pipe 4 has a uniform circular shape. This arrangement is effective to restrain a noise generated during falling of the waste container 2 through the vertical transport pipe 4. That is, if the vertical transport pipe 4 has a portion nonuniform in cross-section, a problem might arise that an intensive noise is produced when the waste container 2 passes through the portion.

Embodiments of the above throwing device will be described in detail below with reference to the accompanying drawings.

Figure 2:
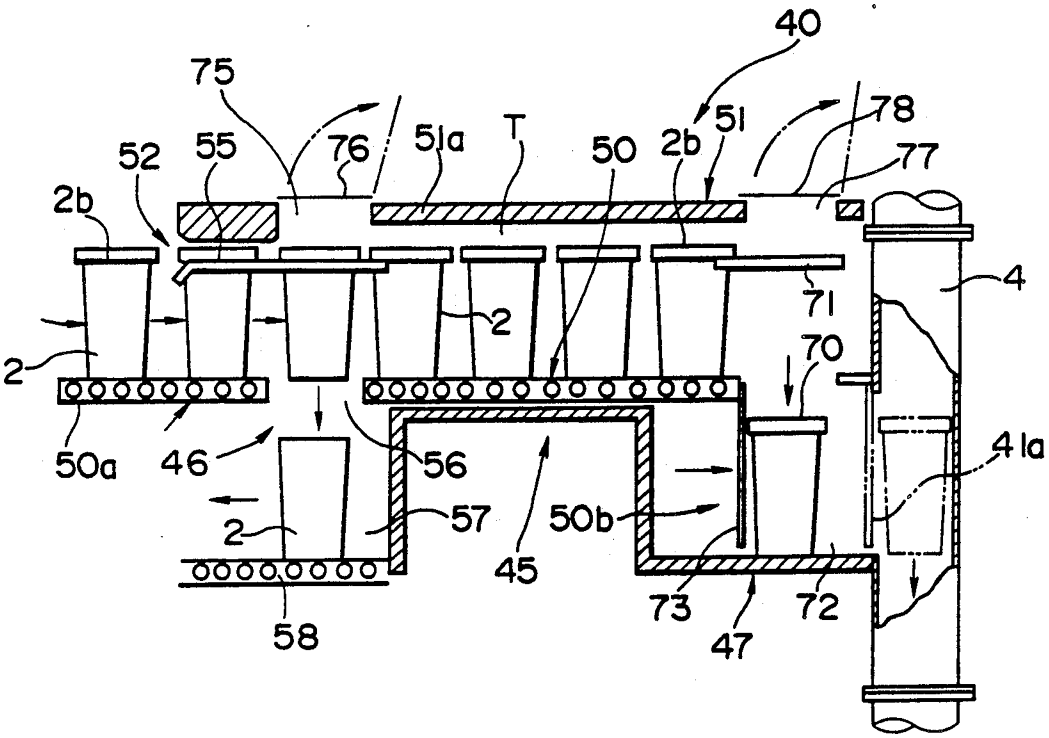
FIG. 2 is a conceptional view showing a first embodiment of a throwing device.
Figure 3:
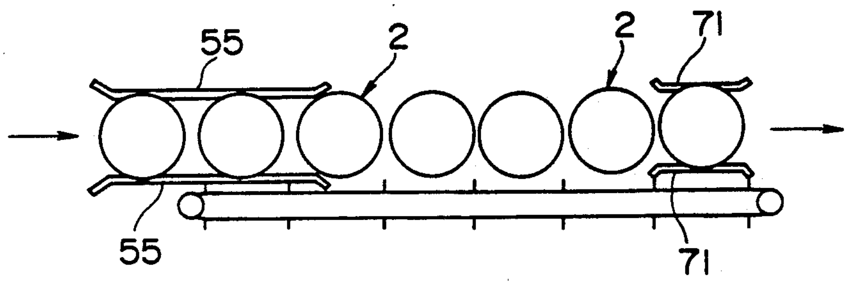
FIG. 3 is a conceptional view showing a waste container in the vicinity of the throwing device.

FIGS. 2 and 3 show an embodiment of a throwing device 40. In FIG. 2, the reference numeral 4 denotes the vertical transport pipe 4 which is so arranged as to extend through each floor of the building. The throwing device 40 is composed of principal components which include a conveyer mechanism 45 for conveying the waste containers 2, an inspecting mechanism 46 arranged to be connected midway of the conveyer mechanism 45, and a throwing mechanism 47 arranged to be connected to a terminating end of the conveyer mechanism 45.

The conveyer mechanism 45 comprises a roller conveyer 50 which is arranged horizontally toward the vertical transport pipe 4 at a location slightly higher than a location where an opening 41*a* is formed in the vertical transport pipe 4. The roller conveyer 50 is covered with a housing 51. Defined between a top wall 51*a* of the housing 51 and the roller conveyer 50 is a transportation passageway T having a height which enables the upstanding waste containers 2 to pass. Further, a throwing opening 52 for the waste containers 2 is formed on the side of an end of the housing 51 remote from the opening 41*a* in such a fashion that an initial end 50*a* of the roller conveyer 50 is exposed at the throwing opening 52. The inspecting mechanism 46 is connected to a portion of the roller conveyer 50 adjacent the throwing opening 52, while the throwing mechanism 47 is connected to a portion of the roller conveyer 50 adjacent the vertical transport pipe 4.

The above inspecting mechanism 46 is composed of first guide bars 55 and 55 which are arranged horizontally at a location above the initial end 50*a* of the roller conveyer 50 and slightly lower than the elevation of the closures of the respective upstanding waste containers 2, a detecting opening 56 which is formed by omission of a portion of the roller conveyer below the first guide bars 55 and 55 and through which the waste containers 2 can pass, a delivery passage 57 defined below the detecting opening 56, and a delivery conveyer 58 arranged at a bottom of the delivery passage 57. The arrangement is such that the spacing between the first guide bars 55 and 55 is set to a value enabling the upstanding waste containers 2 to pass between the guide bars 55 and 55 so that during passage of the waste containers 2, their respective closures 2*b* can be supported by the first guide bars 55 and 55 and the waste containers 2 can depend from the first guide bars 55 and 55.

On the other hand, the roller conveyer 50 has a terminating end 50*b* which is located short of the vertical transport pipe 4 so that a falling opening 70, through which the waste container 2 can pass vertically, is defined between the terminating end 50*b* and the vertical transport pipe 4. Second guide bars 71 and 71 are arranged horizontally above the falling opening 70. The second guide bars 71 and 71 are supported by a drive mechanism (not shown) in such a manner that the spacing between the bars is adjustable.

The above throwing mechanism 47 is arranged below the falling opening 70 and is composed of a moving passage 72 communicating with the opening 41*a* of the vertical transport pipe 4, a pusher plate 73 arranged to be movable toward the opening 41*a* through the moving passage 72, and pushing means such as a cylinder or the like for moving the pusher plate 73.

An inspection opening 75 is formed in a portion of the top wall 51*a* of the housing 51 above the detecting opening 56. A first access door 76 is arranged at the inspection opening 75 in such a fashion as to be capable of being opened and closed. An inspection opening 77 is formed in a portion of the top wall 51*a* above the falling opening 70. A second access door 78 is arranged at the inspection opening 77 in such a fashion as to be capable of being opened and closed.

A case where the above arrangement is employed to throw the waste into the vertical transport pipe 4 will next be described.

The waste discharged at each location within the building is accommodated in the body 2*a* of the waste container 2 and, subsequently, the closure 2*b* is fixedly mounted to the body 2*a* to sealingly close the same. In throwing-away of the waste container 2, a user transports the waste container 2 to the throwing opening 52 provided at each floor and, subsequently, mounts the waste container 2 onto the initial end 50*a* of the roller conveyer 50. The roller conveyer 50 delivers the waste container 2 to the right as viewed in FIG. 3.

In the course of delivery, the waste container 2 first passes between the first guide bars 55 and 55 of the inspecting mechanism 46. As the waste container 2 passes between the first guide bars 55 and 55, the closure 2*b* rides onto the upper surfaces of the respective guide bars 55 and 55 so that as the waste container 2 passes above the inspection opening 56, the body 2*a* is hung from the guide bars 55 and 55. Thus, if the closure 2*b* is not mounted to the body 2*a* of the waste container 2, or if mounting of the closure 2*b* is insufficient, the waste container 2 falls down under its own weight into the delivery passage 57 during passage, and is discharged by the delivery conveyer 58. In this manner, it is made possible by the inspecting mechanism 46 to beforehand exclude the waste container 2 which is defective in mounting of the closure 2*b*.

The waste containers 2 are pushed by the succeeding waste containers 2 and are caused to successively pass through the guide bars 55 and 55. The waste containers 2 move along the roller conveyer 50 to the right as viewed in FIG. 3 and reach the terminating end 50*b* of the roller conveyer 50. Subsequently, the waste containers 2 move between the second guide bars 71 and 71. As the waste container 2 reaches the guide bars 71 and 71, the drive mechanism (omitted from the figure) enlarges the spacing between the guide bars 71 and 71 to cause the waste container 2 to fall onto the moving passage 72.

As the waste container 2 falls onto the moving passage 72, the pushing means moves the pusher plate 73 toward the opening 41*a* of the vertical transport pipe 4 to push and move the waste container 2 toward the opening 41*a*, thereby throwing the waste container 2 into the vertical transport pipe 4. It is to be noted here that with respect to the waste container 2 to be thrown into the vertical transport pipe 4, it has been ascertained by the inspecting mechanism 46 that the closure 2*b* is regularly mounted to the body 2*a*. Thus, it is prevented that during subsequent movement through the vertical transport pipe 4, the closure 2*b* is unintentionally opened to disperse the waste. In addition, it is possible to temporarily store a plurality of waste containers 2 between the opening 41*a* of the vertical transport pipe 4 and the throwing opening 52. In this storage state, the waste containers 2 can be concealed by the housing 51, so that the good appearance is prevented from being marred. Further, since the vertical transport pipe 4 and the throwing opening 52 are remote from each other, the falling sound of the waste container 2 falling through the vertical transport pipe 4 is not offensive to the ear. Usually, the pusher plate 73 is located at a position where the pusher plate 73 cooperates with the wall surface of the vertical transport pipe 4 to form the inner wall surface thereof. Thus, the inner surface of the vertical transport pipe 4 has no irregularity. This also effectively serves to reduce the rasping falling sound.

The above-described operation is repeatedly carried out, whereby the waste thrown away at various locations within the building can be accumulated into the reservoir. Since the waste is handled throughout the course of collection of the waste in such a fashion that the waste is accommodated in the waste containers, the waste is prevented from contaminating the installation such as the transport pipes and the like. Thus, no problem of offensive smell arises throughout, and the waste collecting system is excellent sanitarily and aesthetically.

Figure 4:
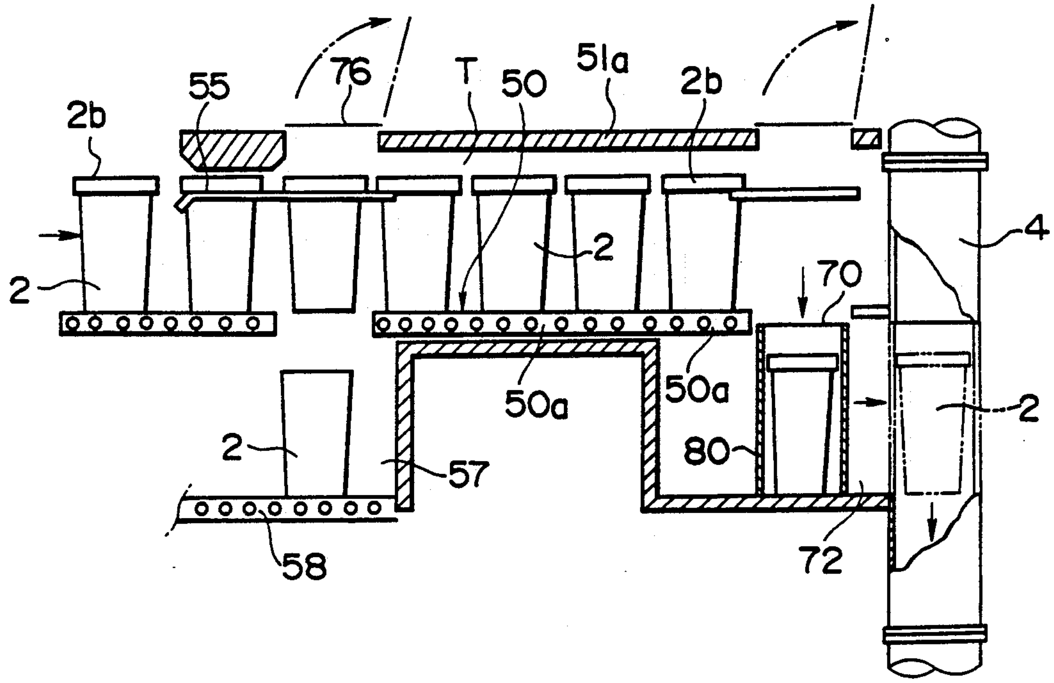
FIG. 4 is a conceptional view showing a second embodiment of the throwing device.
Figure 5:
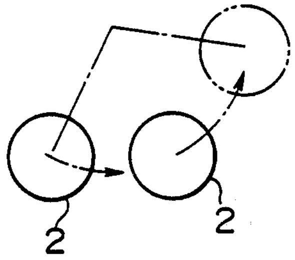
FIGS. 5 and 6 are conceptional views showing a pushing mechanism of the throwing device.

FIGS. 4 and 5 illustrate a second embodiment of the throwing device.

The throwing device is different from the above-mentioned first embodiment in the arrangement of the throwing mechanism.

In the embodiment, a charging tube 80 is employed in substitution for the aforesaid pusher plate 73. The charging tube 80 is arranged to be movable within the moving passage 72. As the charging tube 80 receives the waste container 2 falling from the falling opening 70, the charging tube 80 moves together with the waste container 2 through the moving passage 72 toward the vertical transport pipe 4. The vertical transport pipe 4 is provided therein with an opening which is formed by cutting a portion having the same height as the charging tube 80 out of the vertical transport pipe 4. The charging tube 80 moves into the vertical transport pipe 4 through the opening as shown in FIG. 5, so that the waste container 2 can be thrown into the vertical transport pipe 4. Since it is necessary for the charging tube 80 to cover the cut-out portion of the vertical transport pipe 4, the charging tube 80 is formed to have the same diameter as the vertical transport pipe 4. Other feature and arrangement of the embodiment are the same as those of the first embodiment, and it is also possible for the embodiment to obtain advantages similar to those of the first embodiment.

Figure 6:
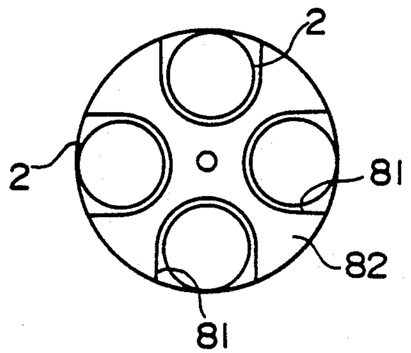

FIG. 6 illustrates a third embodiment of the throwing device.

The arrangement of the embodiment is such that a rotary member 82 is arranged to extend over the moving passage 72 and the vertical transport pipe 4, in which the rotary member 82 is provided with four charging tubes 81 in substitution for the pusher plate 73 of the first embodiment. Also in this embodiment, a portion of the vertical transport pipe 4 is cut out like the above-mentioned second embodiment. As the rotary member 82 rotates, the four charging tubes 81 are successively located at the cut-out portion of the vertical transport pipe 4 to close the same, so that the waste containers 2 within the respective charging tubes 81 can successively be thrown into the vertical transport pipe 4. In the embodiment, each charging tube 81 has an inner diameter the same as that of the vertical transport pipe 4. Further, one of the charging tubes 81 is always in a position coaxial to the vertical transport pipe 4. This is to prevent the charging tube 81 from interfering with passage of the waste container 2 thrown from the upward position. Feature and arrangement other than those described above are identical with those of the aforesaid first or second embodiment. It is also possible for the embodiment to obtain advantages like those of the first or second embodiment.

Figure 7:
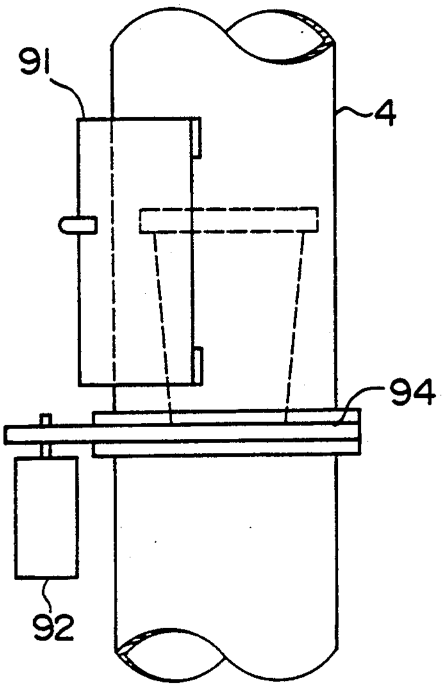
FIGS. 7 and 8 are conceptional views showing another embodiment of the throwing device.
Figure 8:
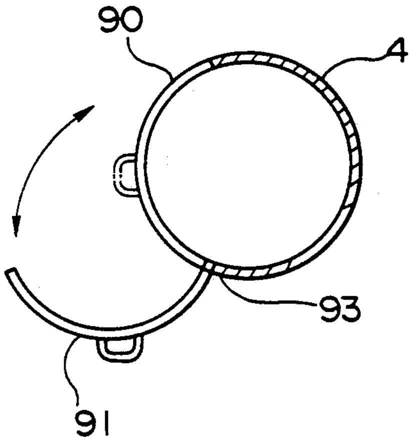

FIGS. 7 and 8 are conceptional views showing a fourth embodiment of the throwing device. The embodiment is simplified in construction, as compared with the aforementioned embodiments. The vertical transport pipe 4 has an opening 90 which is adapted to be covered by a closure 91 having one side thereof hinge-joined by a hinge 93. With the closure 91 in its closed position, the inner surface of the vertical transport pipe 4 forms a hollow portion having a uniform cross-section. A shutter valve 94 is arranged just below the closure 91 and is capable of opening and closing the hollow portion of the vertical transport pipe 4. When it is desired to throw the waste container into the vertical transport pipe 4, the closure 91 is opened, and the waste container 2 is thrown into the vertical transport pipe 4. At this time, the shutter valve 94 is in the closed position where the hollow portion of the vertical transport pipe 4 is closed. Subsequently, the closure 91 is closed. The closure 91 may be one which is capable of being opened and closed freely at any time. It is desirable, however, that a control device (not shown) is provided, and the closure 91 is operated to be opened and closed by the control device, or the propriety of opening and closing of the closure 91 is controlled by the control device. In addition, it is desirable that the shutter valve 94 is opened and closed by a drive unit 92. If the opening and closing operation of the shutter valve 94 is carried out by the drive unit 92, excessive power is not required for opening and closing the closure 91 and, at the same time, it can be ensured to carry out the opening and closing. Further, if the throwing device has a controller and the drive unit 92 is operated under the control of the controller, such control or the like can be carried out that the closure 91 is so locked as not to be opened when another waste container 2 has already been thrown into the vertical transport pipe 4. By doing so, it is made possible to prevent a clogging accident of the vertical transport pipe 4.

Figure 12:
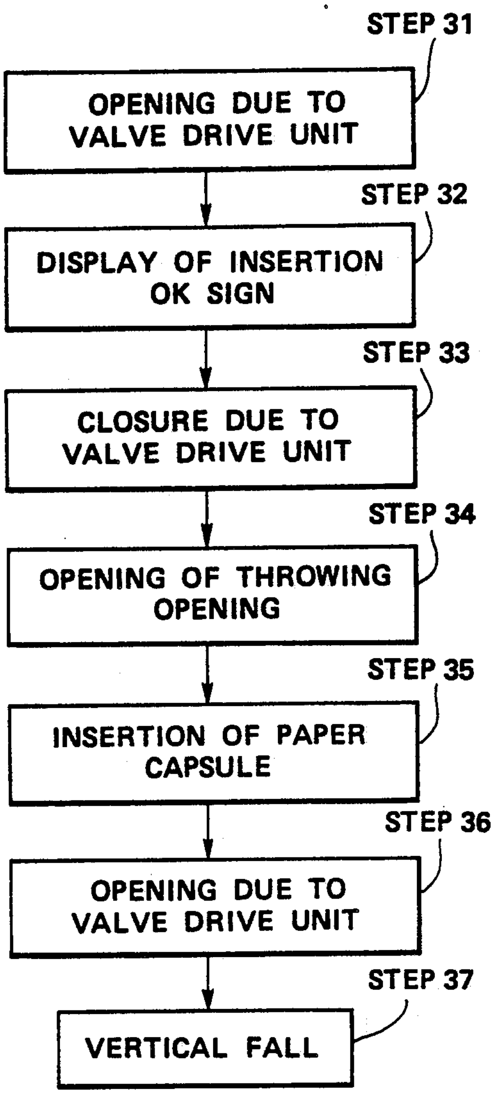
FIGS. 12 through 14 are flow charts showing control methods.

FIG. 12 is a flow chart conceptually showing an example of the control due to the above controller.

The shutter valve 94 is normally maintained opened (step 31) so as not to interfere with falling of the waste container from the upward position. At this time, a lamp is turned on to indicate that it is possible to throw away the waste containers 2 (step 32). Meanwhile, if it is indicated by means of depression of a button, for example, that the waste is to be thrown away, the controller moves the shutter valve 94 to the closed position (step 33), and to open the closure 91 (step 34). Then, the waste container 2 is thrown into the vertical transport pipe 4 (step 35), and the closure 91 is closed. The controller opens the shutter valve 94 (step 36) to cause the waste container 2 to fall down through the vertical transport pipe 4 (step 37). The arrangement is desirably such that in this sequential operation, the controller ascertains the operating conditions of other throwing devices, and prohibits operation of the throwing device in question if other throwing devices connected to the same vertical transport pipe 4 have already been ready for receiving the waste containers 2. The controller is operated to carry out indication or display to that effect. Thus, such a problem is avoided that a plurality of waste containers are thrown into the same vertical transport pipe 4 to cause a clogging accident or the like.

Figure 9:
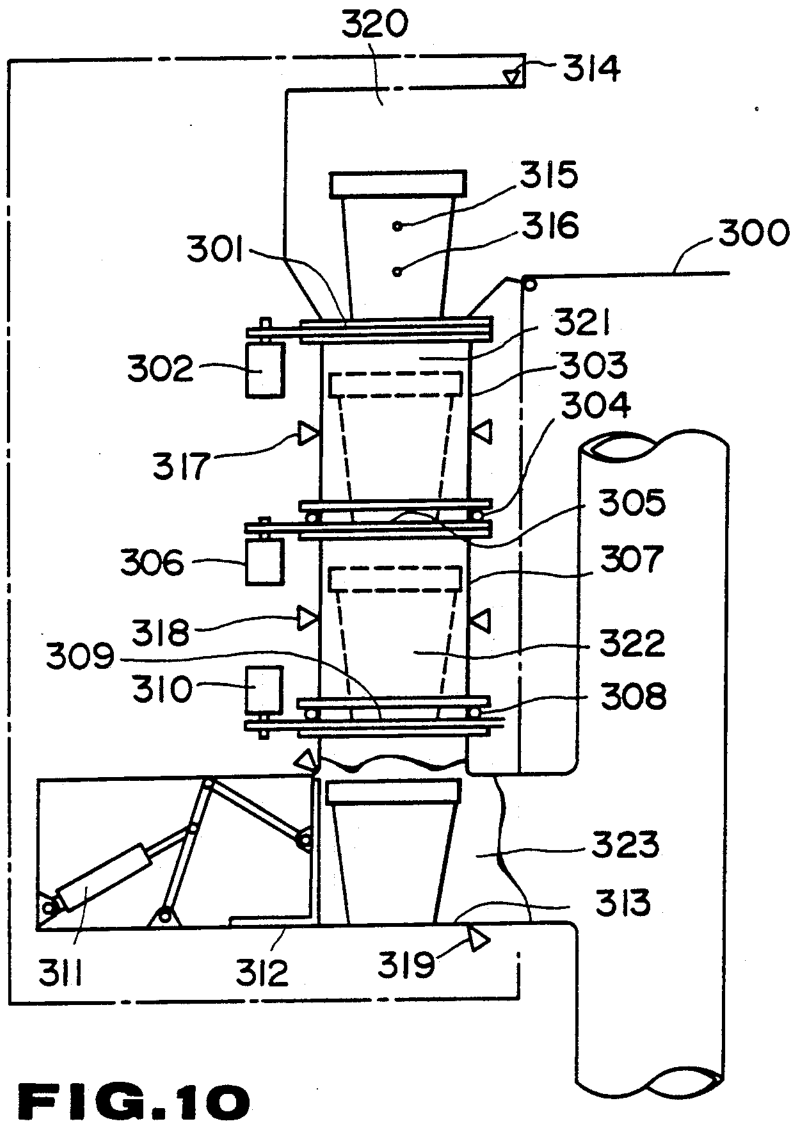
FIGS. 9 and 10 are conceptional views showing still another embodiment of the throwing device.
Figure 10:
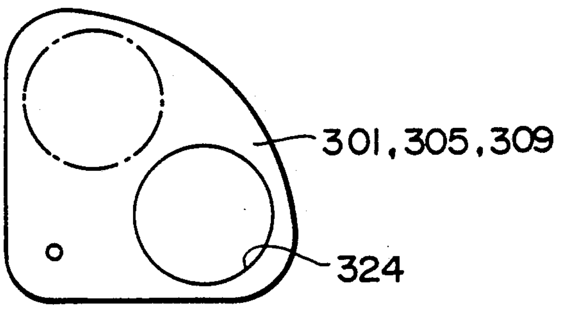

FIGS. 9 and 10 are conceptional views showing a fifth embodiment of the throwing device. In FIG. 9, the reference numeral 300 denotes a door; 301, a first flap valve; 302, a first flap valve drive unit; 303 and 307, tubular members; 304, 308, air-tight tubes; 305, a second flap valve; 306, a second flap valve drive unit; 309, a third flap valve; 310, a third flap valve drive unit; 311, a pushing unit; 312, a pusher plate; and 313, a retreating pipe. Further, shape sensors 314, 315 and 316 are arranged in facing relation to a space (first chamber 320) above the first flap valve 301. Photosensors 317, 318 and 319 are arranged in facing relation respectively to hollow portions (second and third chambers 321 and 322) of the respective tubular member 303 and 307 and to a hollow portion (fourth chamber 323) of the retreating pipe 313. Each of the tubular members 303 and 307 has an inner diameter slightly larger than the outer configuration of the waste container 2. In the throwing device, its operation is started by insertion of a personal key which the user has. FIG. 10 shows the first to third flap valves 301, 305 and 309.

Figure 14:
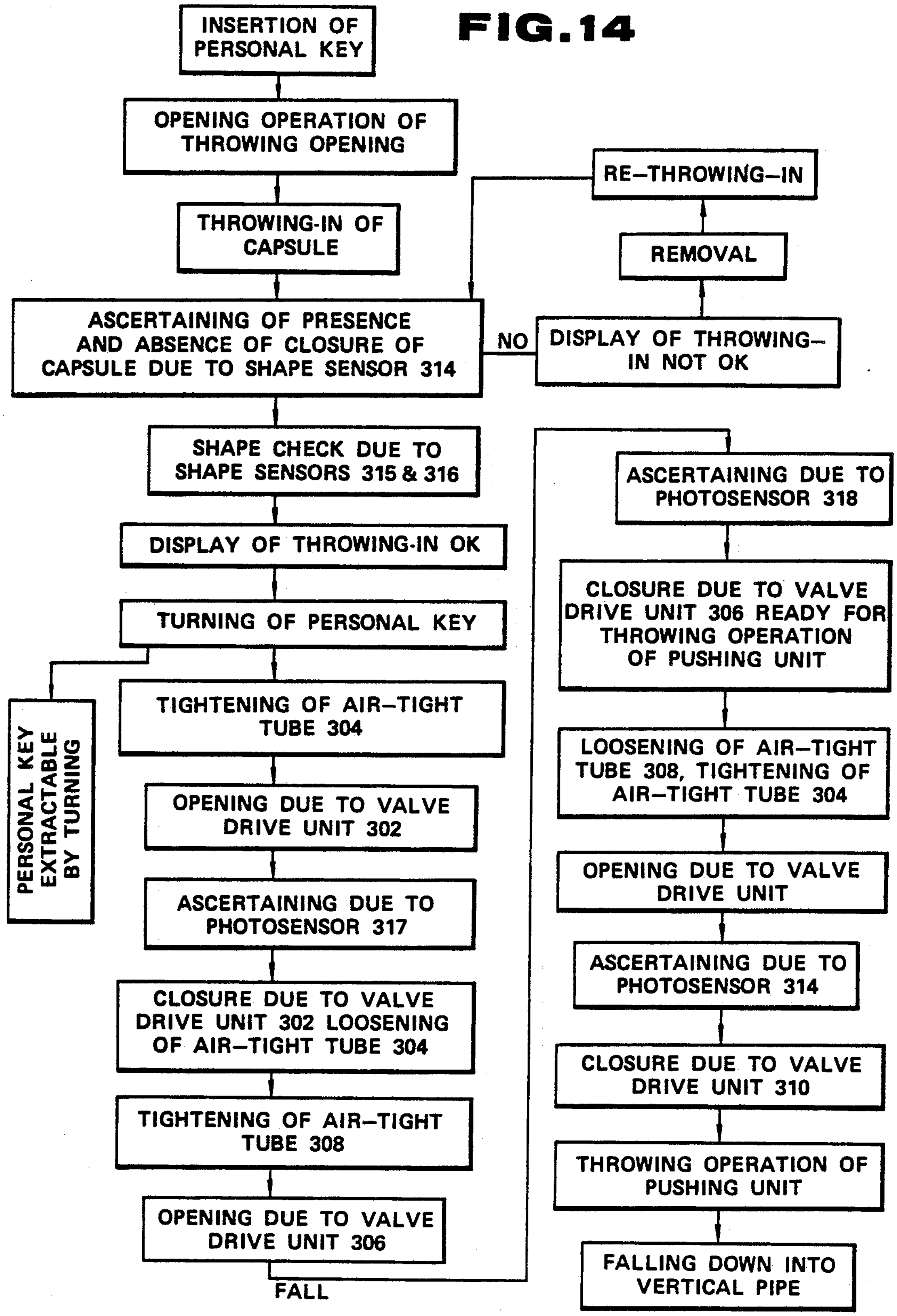

The operation of the throwing device will be described below with reference to a flow chart shown in FIG. 14. The personal key is first inserted into the throwing device and, subsequently, the door 300 is opened. The waste container 2 is thrown into the first chamber 320, and the door is then closed. At this time, the first flap valve 301 is in a position (closed position) where the bottom of the first chamber 320 is closed by the solid section of the first flap valve 301. The shape sensors 314, 315 and 316 arranged in facing relation to the first chamber 320 ascertain the configuration of the object within the first chamber 320 to thereby detect that the waste container 2 has been thrown away. As the object is thrown into the throwing device, the shape sensors transmit their respective signals representative of the object, to a control device. The control device judges whether or not the object in question is the waste container (by the sensors 315 and 316), and whether or not the closure is fixedly mounted regularly to the container body (by the sensor 314). If it is found that the object thrown at this time is not regular, the control device causes the throwing device to carry out display to that effect, and the object is removed. A necessary step is taken so as to fix the closure regularly, and other like necessary steps are also taken. Thereafter, the control device calls upon the user to again throw away the waste container.

If it is ascertained that the object is regular, the control device displays that the throwing device is in a position enabling throwing, and releases locking of the personal key. At this time, it is made possible for the first time to extract the personal key. Accordingly, if there are no more waste containers to be thrown away, the personal key is extracted and the manual operation is completed.

Subsequently, the control device angularly moves the first flap valve 310 in the horizontal plane by about 60 degrees to move an opening 324 in the flap valve 301 to a position (open position) coaxial to the tubular member 303. By this operation, the first chamber 320 is brought into communication with the second chamber 321. At this time, the second flap valve 305 closes the bottom of the second chamber 321, and the air-tight tube 304 is in an inflated state to close a gap between the lower end of the tube 303 and the second flap valve 305. The waste container 2 falls under its own weight from the first chamber 320 to the second chamber 321. Since, however, the second chamber 321 forms a closed space, the waste container 2 descends while compressing air below the waste container 2 so that the waste container 2 descends slowly. As the waste container 2 reaches the bottom of the second chamber 321, the photosensor 317 detects this fact.

Subsequently, the air-tight tube 304 is deflated to form the gap between the air-tight tube 304 and the second flap valve 305. The first flap valve 301 is returned to the closed position and, subsequently, the second flap valve 305 is moved in the horizontal plane and is brought to the open position. By this operation, the waste container 2 falls slowly in a manner like that described above, and reaches the bottom of the third chamber 322. At this time, the third flap valve 309 and the air-tight tube 308 close the bottom of the third chamber 322 to define a closed chamber, like that described above.

As it is ascertained by the photosensor 318 that the waste container 2 is accommodated in the third chamber 322, the upper space of the third chamber is made air-tight by the flap valve 305 and the air-tight tube 304. The pushing unit 311 is operated to move the pusher plate 312 to a position displaced to the left as viewed in the figure from a position below the third chamber 322. Subsequently, the air-tight tube 308 is deflated, and the flap valve 309 is moved to the open position. By this operation, the waste container 2 falls down. However, the space above the waste container 2 is brought to negative pressure, the waste container 2 is subjected to upward suction force and falls down slowly.

As the waste container 2 reaches the bottom of the fourth chamber 323, the photosensor 319 detects this fact and operates the pushing unit 311 to move the pusher plate 312 to the right in the figure, thereby throwing the waste container 2 into the vertical transport pipe 4. After throwing-in, the pushing unit 311 maintains the pusher plate 312 to the right-hand position and waits for the subsequent operation. The pusher plate 312 has such configuration that when the pusher plate 312 is in the right-hand position, it cooperates with the wall surface of the vertical transport pipe 4 to form a cylindrical inner wall surface. Accordingly, no noise is generated in the vicinity of the pusher plate 312 when the waste container 2 falls down.

Also for the fifth embodiment constructed as above, it is possible to carry out throwing-away of the waste at any time. The thrown-away waste containers 2 are accumulated at the lower position automatically and smoothly without generation of any noise. Other advantages are similar to those of the above-described embodiments.

Figure 13:
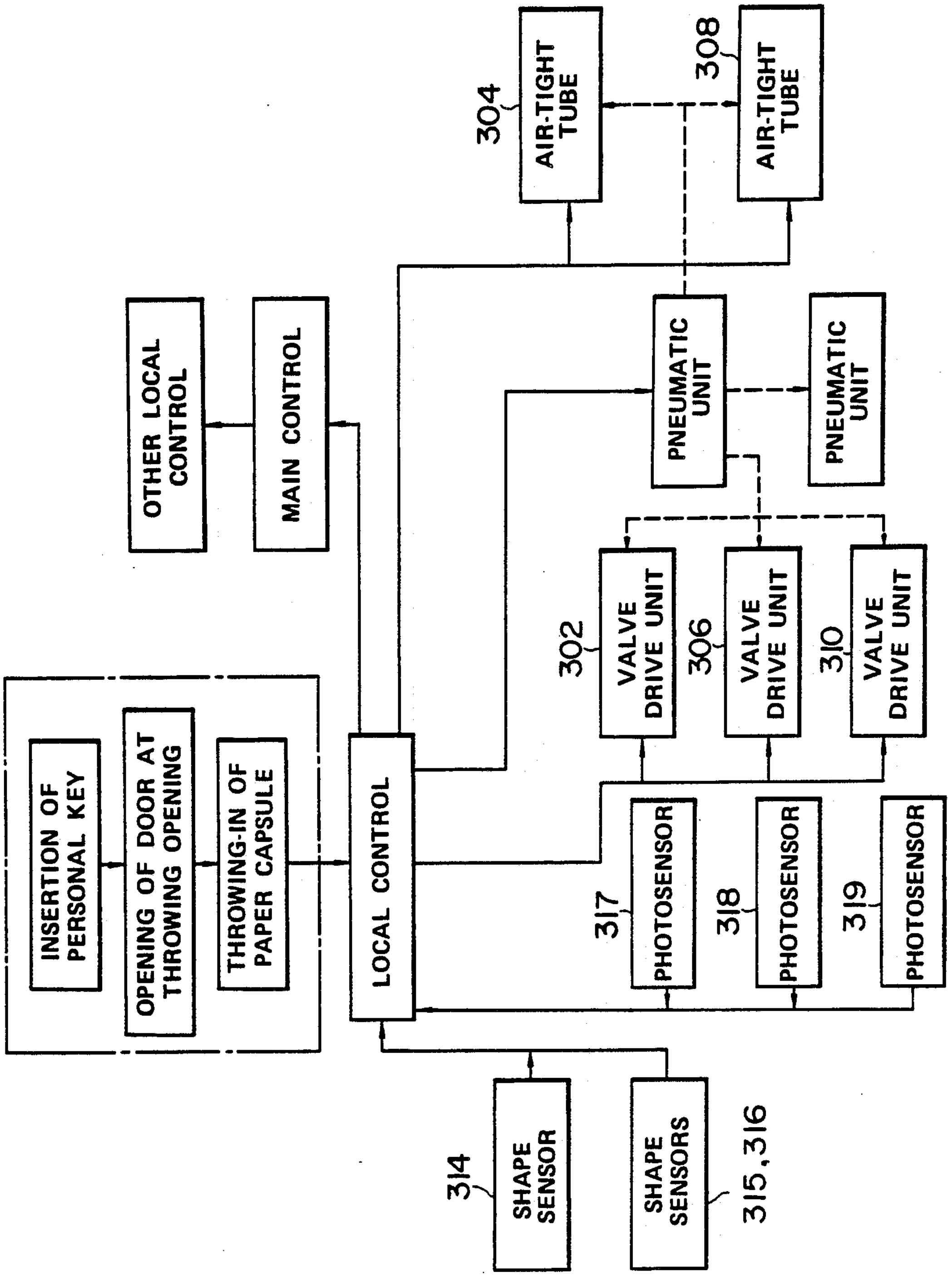

FIG. 13 shows flow of the control signals within the throwing device described above.

When it is desired to throw away the waste, a predetermined personal key is inserted into a card reader mounted in the throwing device. If the predetermined personal key is inserted, the lock of the throwing opening is released, so that the door is opened and the waste container (paper capsule) is thrown away.

The subsequent operation is entirely controlled by a local controller provided at each of the throwing devices. That is, the detecting signals from the respective shape sensors 314, 315 and 316 are sent to the local controller. In response to the detecting signals, the local controller actuates the valve drive units 302, 306 and 310 to open and close the flap valves 301, 305, 309. In addition, the controller drives the pneumatic unit or pushing unit 311 to actuate the air-tight tubes 304 and 308.

The above describes a manner in which transportation of the waste containers 2 and control thereof are carried out in each throwing device. In general, however, the throwing devices are arranged in plural within the building. Accordingly, desirably, the plurality of throwing devices are collectively controlled in such a manner that transportation of the waste is carried out smoothly and efficiently throughout the building, in particular, without occurrence of an accident such as clogging or the like.

Figure 15:
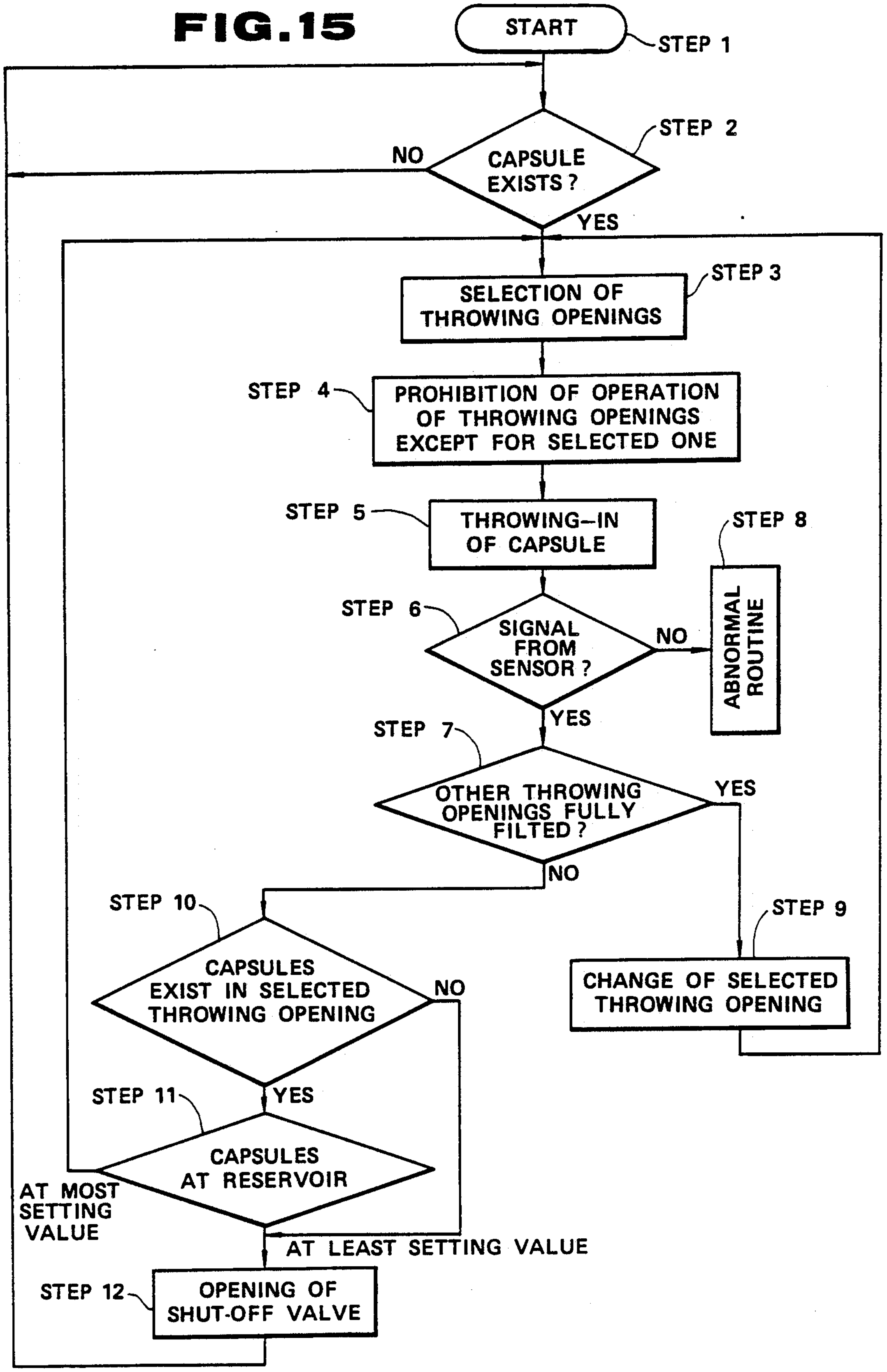
FIG. 15 is a flow chart showing a control method of controlling throwing of waste containers into the same vertical transport pipe.

An example of a method of controlling the plurality of throwing devices by control means will be described below with reference to a flow chart shown in FIG. 15.

As a program incorporated in the control means first starts in operation (step 1), it is investigated whether or not the waste containers are retained in the first to Nth throwing devices connected to the vertical transport pipe (step 2). If the waste containers 2 do not exist in any of the throwing devices, the program does not issue an operation command to the throwing devices. If the waste containers 2 are retained in some of the throwing devices, the program proceeds to a step 3 where, of the throwing devices in which the waste containers exist, only one which is provided at the uppermost floor is rendered operative. With respect to other throwing devices, it is prohibited to throw the waste containers into the vertical transport pipe (step 4). The waste container 2 is thrown from the selected throwing device into the vertical transport pipe 4 (step 5).

A waste container passage sensor comprised of a photosensor is provided within the vertical transport pipe 4 at a location lower than the connecting position of the throwing device which is located at the lowermost floor. The program judges whether or not the sensor detects passage of the waste container 2 within a predetermined period of time after the waste container 2 has been thrown in (step 6). If passage is detected, the program proceeds to a step 7. Otherwise, the program jumps to an abnormal routine (step 8).

At the step 7, the number of the waste containers 2 accommodated in the throwing devices other than the selected throwing device are investigated. If any of the throwing devices is fully filled, the program proceeds to a step 9. Otherwise, the program proceeds to a step 10. At the step 9, the filled throwing device is selected, the program is returned to the step 3, and throwing of the waste containers 2 is carried out from the fully filled throwing device. In this connection, if there are a plurality of filled throwing devices, one of them which is in the uppermost floor is selected.

At the step 10, it is investigated whether the waste containers 2 still remain in any of the throwing devices. If the waste containers 2 remain, the program proceeds to a step 11, while if no waste containers 2 remain, the program proceeds to a step 12.

As described above, the thrown-away waste containers 2 are successively thrown into the vertical transport pipe 4. There is a risk, however, that the waste container 2 falling through the interior of the vertical transport pipe 4 becomes excessive in falling velocity at the lower end portion of the transport pipe 4, and the waste container 2 smashes against the wall surface and is broken to disperse the waste around. Since, however, the waste container 2 and the vertical transport pipe 4 are arranged in such sizes and dimensions that only an extremely slight gap is left between the waste container 2 and the vertical transport pipe 4, air below the waste container 2 is compressed as it falls down to impart deceleration force to the waste container 2, so that the falling velocity is brought to a value lower than a given value. Accordingly, the above problem is dissolved.

Moreover, a controller to be described below may be provided in order to minutely control the falling velocity of the waste container 2.

That is, as shown in FIG. 1, the controller comprises, at the lower end of the vertical transport pipe 4, a pressure gage 415, control means 416, deceleration pipes 411*a*, 411*b* and 411*c* each having an inner diameter smaller than that of the vertical transport pipe 4, and valves 410*a*, 410*b* and 410*c* provided respectively in the deceleration pipes. The arrangement of the controller is such that the control means 416 adjusts opening degrees of the respective valves 410*a*, 410*b* and 410*c* in response to the pressure within the vertical transport pipe 4 measured by the pressure gage 415, to adjust pressure below the waste container 2, thereby adjusting falling velocity of the waste container. The controller may further comprise a communication pipe 409 for bringing the deceleration pipes 411*a*, 411*b* and 411*c* into communication with an upper portion of the vertical transport pipe 4. In this case, as the waste container 2 passes by a location where the communication pipe 409 communicates with the vertical transport pipe 4, air below the waste container 2 is led to a location above the waste container through the communication pipe 409. Thus, the pressure below the waste container 2 is prevented from becoming excessive, so that the waste container is led to the lower end in more smooth, safe and gentle manner.

Motion of the waste container 2 within the vertical transport pipe 4 is expressed by the following equation:

$$Uf=f(dS, W)$$

where

Uf is falling velocity of the waste container 2;

f( ) represents a function;

dS is a difference in cross-sectional area between the vertical transport pipe 4 and the waste container 2; and W is the mass of the waste container (inclusive of the waste).

It is to be noted here that if dS (relief area) is equal to or less than 1/10 of the cross-sectional area of the vertical transport pipe 4, the falling velocity Uf can approximately be expressed by a linear function of the gross weight of the waste container 2. Likewise, with regard to the waste container 2 having a specific cross-sectional area, a fixed relationship exists between the gross weight of the waste container 2 and pressure of air compressed within the vertical pipe 4 by the waste container 2. Accordingly, if the air pressure below the waste container 2 is measured when the waste container 2 is falling down, the gross weight of the waste container 2 can be calculated. If the gross weight of the waste container 2 is calculated, adjustment of the relief area makes it possible to control the falling velocity of the waste container 2.

The embodiment is realized on the basis of the above knowledge. That is, as the waste container 2 starts to fall down through the vertical transport pipe 4, air pressure in a lower portion of the vertical transport pipe 4 is measured to calculate the gross weight of the waste container 2. Then, the relief area is controlled in order to control the falling velocity of the waste container 2 to a predetermined value. This operation is carried out by adjusting the opening degrees of the respective valves 410*a*, 410*b* and 410*c* provided respectively in the deceleration pipes 411*a*, 411*b* and 411*c*. In the above description, it has been explained that the relief area dS is the difference in cross-sectional area between the vertical transport pipe 4 and the waste container 2. More generally, however, the relief area is a flow passage area for air discharged as the waste container 2 falls down. Accordingly, the relief area may be represented by the opening areas of the respective deceleration pipes 411*a*, 411*b* and 411*c* which are provided at the lower end portion of the vertical transport pipe 4, as is in the embodiment.

According to the example illustrated in FIG. 1, the waste container 2 thrown from the throwing device into the vertical transport pipe 4 first falls down while discharging air below the waste container 2 through the gap between the vertical transport pipe 4 and the waste container 2 and through the deceleration pipes 411*a*, 411*b* and 411*c*. However, the inner diameter of the vertical transport pipe 4 is reduced at a tapered section 417. Thus, as the waste container 2 reaches the tapered section 417, the relief area which is the sum of the aforesaid gap and the opening areas of the respective deceleration pipes 411*a*, 411*b* and 411*c* is reduced and, therefore, the waste container 2 is subjected to higher air resistance. At this time, if the wind pressure applied to the waste container 2 from below abruptly rises, there might be a fear that the waste container 2 is broken. The aforementioned bypass tube 409 is provided to avoid this breakage accident. That is, when the waste container 2 is in a position below an upper communicating portion 418 of the bypass pipe 409 and above the deceleration pipes 411*a*, 411*b* and 411*c*, falling-down of the waste container 2 generates air current flowing through the bypass pipe 409 from below to above. This air current is not generated when the waste container 2 is in a position above the upper communicating portion 418 of the bypass pipe 409. Thus, the air current increases the relief area and cancels out the effects due to the reduction in inner diameter of the vertical transport pipe 4. As the waste container 2 continues to fall down, the waste container 2 successively passes by the deceleration pipes 411*a*, 411*b* and 411*c*. Accordingly, the relief area is reduced gradually with falling-down of the waste container 2, so that the gradually increasing braking force is applied to the waste container 2. After the waste container 2 passes by the deceleration pipe 411*c*, the space below the waste container 2 is brought to a closed space and, therefore, the relief area is brought to only an area of the gap between the vertical transport pipe 4 and the waste container 2. Thus, the waste container 2 is subjected to the maximum braking force.

As described above, since the waste container 2 is subjected to the gradually increasing braking force in the vicinity of the lower end of the vertical transport pipe 4, it is ensured that the waste container 2 is smoothly braked and reaches the bottom gently. In addition, adjustment of the opening areas of the respective valves 411*a*, 411*b* and 411*c* by means of the respective valves 410*a*, 410*b* and 410*c* makes it possible to control the magnitude of the braking force and the falling velocity of the waste container 2. Further, if this control is carried out by a controller, the control can be effected automatically and reliably.

Figure 11:
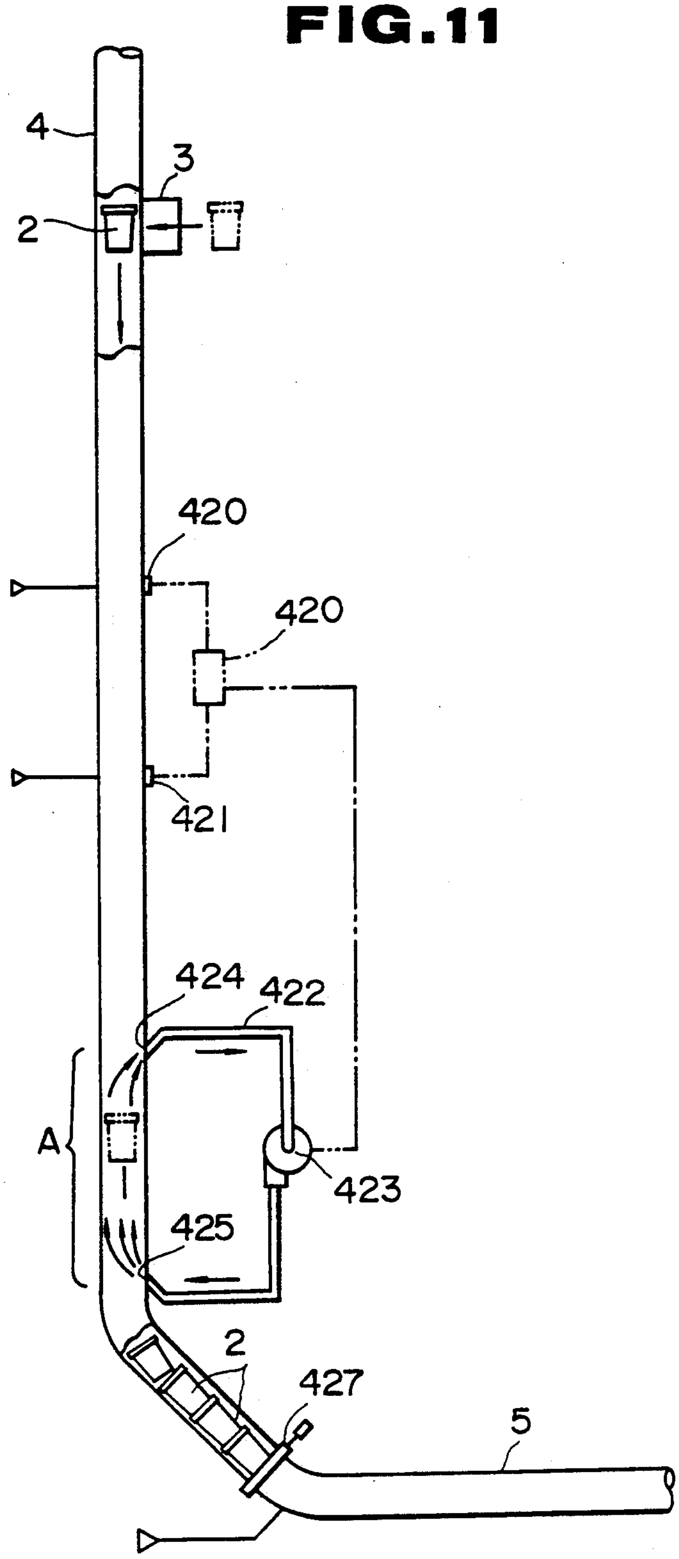
FIG. 11 is a conceptional view showing another embodiment of a falling velocity control device.

FIG. 11 shows a second embodiment for controlling the falling velocity of the waste container through the vertical transport pipe 4.

According to the embodiment, two photosensors 420 and 421 vertically spaced a predetermined distance from each other are arranged at a lower portion of the vertical transport pipe 4. In addition, a bypass pipe 422 and a blower 423 for producing flow through the bypass pipe 422 are provided further to the lower end of the vertical transport pipe 4. The bypass pipe 422 communicates with the vertical transport pipe 4 through two upper and lower communication bores 424 and 425. Operation of the blower 423 forms air flow from above to below through the bypass pipe 422 and from below to above through the vertical transport pipe 4. Flow rate of the air flow is variable by adjustment of the power of the blower 423.

As the waste container 2 is thrown into the vertical transport pipe 4 and passes by the photosensors 420 and 421, the falling velocity of the waste container 2 is calculated on the basis of a difference between times the waste container passes in front of the respective photosensors. An amount of air to be blown at the lower portion of the vertical transport pipe 4 is determined on the basis of the falling velocity or, in addition thereto, the gross weight of the waste container 2 obtained by measurement of pressure within the vertical transport pipe 4 in a manner like that described above. The blower 423 is started to generate an upward air current within the vertical transport pipe 4 as described above. Thus, the waste container 2 is subjected to the upward wind pressure during passage of the waste container 2 through a section A through which the upward air current flows, so that the falling velocity of the waste container 2 is decelerated. By adjustment of the velocity of the ascending current in accordance with the gross weight and the falling velocity of the waste container 2 at the location of the photosensors, it is possible to freely control the velocity of the waste container 2 reaching the lower end of the vertical transport pipe 4. In the embodiment, the lower end portion of the vertical transport pipe 4 is once bent at an angle of about 45 degrees with respect to the horizontal plane, is subsequently bent again, and is connected to the horizontal transport pipe 5. A gate valve 427 is provided at a lower end of the portion extending at the angle of 45 degrees with respect to the horizontal plane. The gate valve 427 is movable between a closed position where the waste containers 2 are stopped and are accumulated on the gate valve 427 and an open position where the waste containers 2 are successively fed out into the horizontal transport pipe 5.

The above description is mainly directed to the arrangement of the single vertical transport pipe 4 and the throwing devices connected thereto. However, control means like that described above can be employed with respect to a case where a plurality of vertical transport pipes 4 are arranged. An example of a control method of the waste collecting system comprising a plurality of vertical transport pipes 4 will be described with reference to the flow chart shown in FIG. 15.

As the operation of the program starts (step 21), it is investigated whether or not the waste containers 2 are retained at the lower ends of the respective first to Nth vertical transport pipes 4, that is, on the aforesaid gate valves (step 22). If the waste containers 2 are not retained in any of the vertical transport pipes 4, the program stops in such a state as to wait that the waste containers 2 are thrown from the throwing mechanisms of the respective throwing devices into the vertical transport pipes 4. At a point of time the waste containers 2 are accumulated in any one of the vertical transport pipes 4, the program proceeds to a step 23. At the step 23, the vertical transport pipe 4 having accumulated therein the waste containers 2 is selected. Rotary valves and the gate valves arranged at the lower ends of respective other vertical transport pipes 4 for connecting the other vertical transport pipes 4 to the horizontal transport pipe 5 are maintained at such conditions that the rotary valves and the gate valves are closed with respect to the other vertical transport pipes 4, and the rotary valves and the gate valves are prohibited from being operated (step 24). The waste containers 2 retained within the selected vertical transport pipe 4 are thrown into the horizontal transport pipe 5 (step 25). This throwing-in of the waste containers 2 can be carried out by alternate rotation of the rotary valves. As the waste containers are thrown into the horizontal transport pipe 5, the blower 8 connected to the horizontal transport pipe 5 is operated to forcibly deliver the waste containers 2 toward the reservoir connected to the terminating end of the horizontal transport pipe 5 (step 26).

A waste container passage sensor comprises of a photosensor is provided within the horizontal transport pipe 5 at a location upstream of the reservoir. The controller judges whether or not a signal informing of passage of the waste containers 2 is sent from the waste container passage sensor within a predetermined period of time after the waste containers 2 are thrown in (step 27). If the signal is sent, the program proceeds to a step 28, while if the signal is not sent, the program jumps to an abnormal routine (step 29).

At the step 29, a discharge valve attached to the reservoir for discharging the waste containers 2 is operated to discharge the waste containers 2 out of the collecting system. Further, at a step 30, the number of the waste containers accumulated within the vertical transport pipes 4 other than the selected one is counted, and it is judged whether the waste containers 2 are fully filled in any one of the vertical transport pipes 4. If the fully filled vertical transport pipe 4 exists, the program proceeds to a step 32, while if no fully filled vertical transport pipe 4 exists, the program proceeds to a step 31. At the step 32, the fully filled vertical transport pipe 4 is selected, and the program is returned to the step 23 to carry out throwing-in of the waste containers 2 from the fully filled vertical transport pipe 4.

At the step 31, it is judged whether the waste containers 2 still remain in any of the vertical transport pipes 4. If the waste containers remain, the program is returned to the step 23 to continue the throwing-in operation of the waste containers 2. If no waste containers remain, the program is returned to the step 22 so that the program is brought to the state waiting throwing of the waste containers 2 into the vertical transport pipes 4.

In the manner described above, the waste containers 2 are regularly thrown from the plurality of the vertical transport pipes 4 into the horizontal transport pipe 5.

In the above description on the waste collecting system and method of the invention, the transportation controlling method in case where the waste containers 2 exist within the vertical transport pipes 4, and the transportation controlling method in case where the waste containers 2 exist within the horizontal transport pipe 5 have been described separately from each other. It is needless to say, however, that these may be combined with each other to control transportation of the waste containers 2 within the system. That is, the waste containers 2 thrown from the throwing devices 3 are thrown into the vertical transport pipes 4 in due order in accordance with the above-mentioned control method, and the waste containers 2 are thrown into the horizontal transport pipe 5 in due order in accordance with the above-mentioned control method. By doing so, the entire operation from the point of time each person throws the waste container 2 into the throwing device 3 to the point of time the waste containers 2 are accumulated at the waste container accumulating location is consistently carried out under control.

The waste collecting system and method of the invention may further include a device or a step in which if the horizontal transport pipe 5 is clogged with the waste containers 2, air is caused to flow backward to release the clogging and, subsequently, blowing is again effected to forcibly deliver the waste containers through the horizontal transport pipe 5.

INDUSTRIAL APPLICABILITY

As described above, the waste collecting system or method according to the invention has the following advantages:

(1) Restriction of time the waste is thrown away is entirely eliminated, and the degree of freedom by which the waste is thrown away is improved.

(2) Further, no waiting time occurs when the waste is thrown away.

(3) Since it becomes unnecessary to store the waste at each door for a long period of time, sanitation is ensured, and an attempt can be made to effectively utilize the space.

(4) Since the throwing devices can be arranged at a plurality of locations within the building, it is possible to save labors required for transporting the waste.

(5) Since the waste is thrown away after having been accommodated in the waste containers, it is prevented that as is in the case of the usual dust chute, the waste disperses in the chute to present uncleanliness.

(6) In addition, the waste does not disperse at the accumulating location, so that sanitation and good appearance are ensured, and the handling is made easy.

(7) Since it is not required to arrange deodorizing devices or the like along the transportation path of the waste, the installation is simplified in construction as a whole.

(8) If the waste is accommodated in the separate waste containers from kind to kind of the waste, efficiency of the discriminating operation at the accumulating location is enhanced.

(9) If the waste containers are formed by disposable containers, the collecting operation of the containers are dispensed with, so that labors required to thrown away the waste is considerably reduced as a whole.

What is claimed is:

1. A method of collecting waste containers, comprising the steps of:

(a) detecting throwing device accommodating waste containers therein;

(b) operating one of the throwing devices, prior to the operation of other throwing devices detected by said detecting step (a), to throw the waste containers accommodated therein into a vertical transport pipe while temporarily rendering the other throwing devices inoperative to prevent clogging of the vertical transport pipe;

(c) decelerating falling waste containers at a lower portion of the vertical transport pipe so as to prevent the falling waste containers from being damaged when the waste containers reach a shut-off valve provided at the lower portion of said vertical transport pipe;

(d) after the step of (c), counting the number of the waste containers falling onto said shut-off valve to judge whether or not the number of waste containers is at least equal to a predetermined number;

(e) opening the shut-off valve when the number of waste containers is at least equal to the predetermined number in the judging step (d), to discharge the waste containers from the lower end of the vertical transport pipe;

(f) returning to said step (b) when the waste containers do not reach the predetermined number in the judging step (d); and (g) after the discharging step (e), returning to the step (a).

2. A method according to claim 1, prior to said step (b), including the steps of:

(h) detecting a throwing device fully filled with the waste containers, of the detected throwing devices detected in step (a) as having waste containers accommodated therein;

(i) when a fully filled throwing device is detected in the detecting step (h), regarding said fully filled throwing device as said one of the throwing devices operated in said step (b); and (j) when no fully filled throwing device exists in the detecting step (h), returning to the judging step (d).

3. A method of collecting waste containers, comprising the steps of:

(a) operating one of throwing devices arranged at a plurality of floors of a building, the one throwing device having accommodated therein waste containers, and throwing the waste containers into a vertical transport pipe mounted substantially vertically to said building;

(b) decelerating the falling waste containers at a lower portion of the vertical transport pipe so as to prevent the thrown-in waste containers from being broken when the waste containers reach a shut-off valve provided at a lower end of said vertical transport pipe;

(c) detecting throwing devices having accommodated therein the waste containers, of said throwing devices;

(d) operating the throwing device at the uppermost floor, of the throwing devices detected by said detecting step (c) to throw the waste containers into the vertical transport pipe, and rendering other throwing devices inoperative;

(e) after the step (d), counting the number of the waste containers falling onto said shut-off valve to judge whether or not the waste containers are at least equal to a predetermined number;

(f) opening the shut-off valve when the waste containers are at least equal to the predetermined number in the judging step (e), to discharge the waste containers from the lower end of the vertical transport pipe;

(g) returning to said step (d) when the waste containers do not reach the predetermined number in the judging step (e); and (h) after the discharging step (f), returning to the step (c).

* * * * *